United States Patent
Lee et al.

(10) Patent No.: US 7,124,989 B1
(45) Date of Patent: Oct. 24, 2006

(54) LATCH SYSTEM FOR VIDEO MONITOR

(75) Inventors: Jong Min Lee, Gumi (KR); Myung Ho Ha, Gumi (KR); Jun Huem Baek, Gumi (KR)

(73) Assignee: KTV USA, Inc., Esat Rutherford, NJ (US)

( * ) Notice: Subject to any disclaimer, the term of this patent is extended or adjusted under 35 U.S.C. 154(b) by 205 days.

(21) Appl. No.: 10/664,174

(22) Filed: Sep. 17, 2003

(51) Int. Cl.
*A47F 5/00* (2006.01)

(52) U.S. Cl. ............ 248/288.11; 248/917; 248/919; 248/923; 248/922; 348/837; 224/311; 296/377

(58) Field of Classification Search ............ 248/310, 248/917–924, 288.11; 340/436, 903, 937; 348/837; 224/311, 548, 553, 929; 296/377; 292/289
See application file for complete search history.

(56) References Cited

U.S. PATENT DOCUMENTS

| | | | |
|---|---|---|---|
| 4,331,890 A | 5/1982 | Makino et al. | |
| 4,561,002 A | 12/1985 | Chiu | |
| 5,216,909 A * | 6/1993 | Armoogam | 70/278.7 |
| 5,362,144 A | 11/1994 | Shioya et al. | |
| 5,465,091 A | 11/1995 | Nishino et al. | |
| 5,583,735 A | 12/1996 | Pease et al. | |
| 5,711,414 A | 1/1998 | Nishitani et al. | |
| 6,012,785 A | 1/2000 | Kawasaki | |
| 6,059,255 A | 5/2000 | Rosen et al. | |
| 6,325,429 B1 | 12/2001 | Oxley | |
| 6,373,216 B1 | 4/2002 | Ho | |
| 6,384,875 B1 | 5/2002 | Bertagna | |
| 6,412,848 B1 | 7/2002 | Ceccanese et al. | |
| 6,424,386 B1 | 7/2002 | Shimizu | |
| 6,484,993 B1 * | 11/2002 | Huffman | 248/323 |
| 6,615,625 B1 * | 9/2003 | Davis | 70/278.3 |
| 6,848,729 B1 * | 2/2005 | Caspi et al. | 292/341.16 |
| 2001/0013742 A1 * | 8/2001 | Lu | 312/223.2 |
| 2001/0052839 A1 * | 12/2001 | Nahata et al. | 340/5.72 |
| 2002/0093436 A1 * | 7/2002 | Lien | 341/34 |
| 2003/0216817 A1 * | 11/2003 | Pudney | 700/17 |
| 2004/0012570 A1 * | 1/2004 | Cross et al. | 345/173 |
| 2004/0189881 A1 * | 9/2004 | Cook et al. | 348/837 |
| 2004/0195845 A1 * | 10/2004 | Chevalier | 292/201 |
| 2004/0264851 A1 * | 12/2004 | Amiri | 385/31 |
| 2005/0251915 A1 * | 11/2005 | Elizondo | 5/611 |

* cited by examiner

*Primary Examiner*—Amy J. Sterling
(74) *Attorney, Agent, or Firm*—Seth Natter; Natter & Natter

(57) ABSTRACT

A processor implemented video monitor includes a display housing hinged to an overhead console. The display housing is stowed in an open stowage cavity of the console and is maintained in its stowed position by a latch detent pin which projects through an opening in a cavity wall and engages a recess, aperture or slot in a wall of the housing. The detent pin is retracted by a solenoid mounted within the console for releasing the display housing for deployment to a viewing position. A shallow finger well having exposed touch sensor terminals is formed in the console. Upon placement of a finger in the well and against the terminals, a solenoid driving circuit actuates the solenoid to retract the latch and permit the display housing to lower to a deployed position. The solenoid is optionally actuated through the processor, as by response to a remote control signal sensor or a membrane keypad.

18 Claims, 4 Drawing Sheets

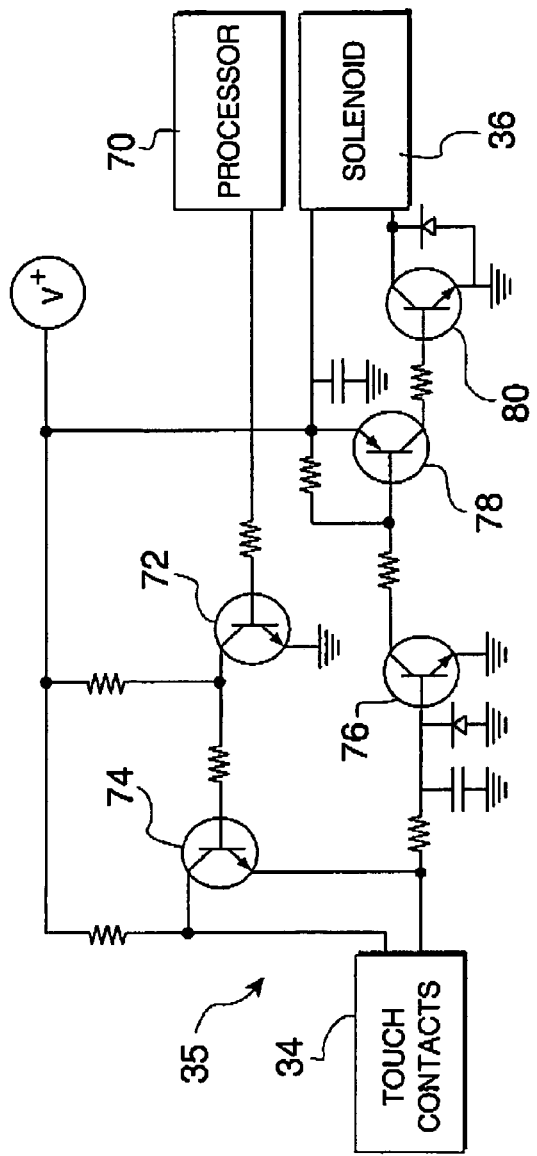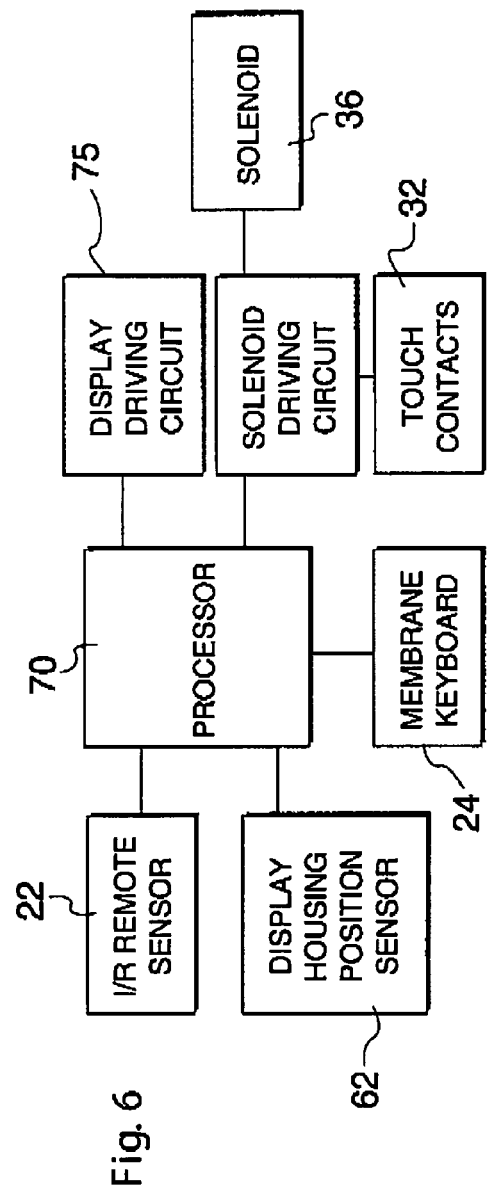

LATCH SYSTEM FOR VIDEO MONITOR

BACKGROUND OF THE INVENTION

1. Field of the Invention

This invention relates generally to video monitors and more particularly to a latch system for retaining a display housing within a stowage cavity of a video monitor console.

2. Antecedents of the Invention

Overhead mounted video monitors, particularly in vehicular applications, generally comprised an LCD or other flat screen display housing pivotally joined to a ceiling mounted console. The display housing rotated from a stowed position, within an open stowage cavity of the console, to a viewing position. Various latch systems have been utilized for maintaining the display housing within the stowage cavity and for releasing the housing, such that the display housing could be pivoted to the viewing position.

Generally, the prior latch systems comprised either a mechanical slide actuation latch release, wherein an operator hand engageable latch knob was slid linearly, or a push button latch mechanism. In push button mechanisms, a button was pressed upwardly, into a ceiling mounted console. Through a suitable mechanical linkage, lateral displacement of a latch out of engagement with the display monitor resulted.

Among the disadvantages of these prior latching systems included their inability to be readily integrated with processor controlled video monitor systems. Further, the prior mechanical latching systems included multiple components which often required maintenance, including lubrication. The latch structures themselves comprised multiple parts and associated assembly costs.

SUMMARY OF THE INVENTION

A processor implemented video monitor includes a display housing hinged to an overhead console. The display housing is stowed in an open stowage cavity of the console and is maintained in its stowed position by a latch detent pin which projects through an opening in a cavity wall and engages a recess, aperture or slot in a wall of the housing. The detent pin is retracted by a solenoid mounted within the console for releasing the display housing for deployment to a viewing position.

A shallow finger well having exposed touch sensor contact terminals is formed in the console. Upon placement of a finger in the well and against the contact terminals, a touch control solenoid driving circuit actuates the solenoid to retract the latch and permit the display housing to lower to a deployed position. The solenoid driving circuit is optionally actuated through the processor, as by response to a remote control signal sensor or a membrane keypad.

The processor includes a nonvolatile memory which stores a display housing position signal when power is disconnected, as by a vehicle ignition switch. The processor actuates the solenoid to restore the last housing position upon power up, if the housing was moved to a stowed position during power off.

From the foregoing compendium, it will be appreciated that it is an aspect of the present invention to provide a latch system for a video monitor of the general character described which is not subject to the disadvantages of the antecedents of the invention aforementioned.

A feature of the present invention is to provide a latch system for a video monitor of the general character described which is easy to use.

A consideration of the present invention is to provide a latch system for a video monitor of the general character described having relatively low maintenance requirements.

A further aspect of the present invention is to provide a latch system for a video monitor of the general character described which is well suited for economical mass production fabrication.

A further consideration of the present invention is to provide a latch system for a video monitor of the general character described which employs but a modicum of moving components.

A further aspect of the present invention is to provide a latch system for a video monitor of the general character described which is relatively low in cost.

A further feature of the present invention is to provide a latch system for a video monitor of the general character described which is actuated through engagement of a touch sensor.

Yet a further consideration of the present invention is to provide a latch system for a video monitor of the general character described which is actuatable through a wireless remote control.

To provide a latch system for a video monitor of the general character described which is well adapted for implementation in a processor controlled video monitor is yet a further aspect of the present invention.

Another consideration of the present invention is to provide a latch system for a video monitor of the general character described which is actuatable by finger placement in a shallow surface depression of a console.

A still further feature of the present invention is to provide a latch system for a video monitor of the general character described which may be engaged to automatically restore a video panel housing position, in the event the housing was stowed while the monitor was powered off.

Other aspects, features and considerations of the present invention in part will be obvious and in part will be pointed out hereinafter.

With these ends in view, the invention finds embodiment in certain combinations of elements, arrangements of parts and series of steps by which the said aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention, FIG. 5 is a schematized illustration of a solenoid driving circuit, and FIG. 6 is a schematized block diagram of components of the processor implemented video monitor including the latch system in accordance with the invention.

DESCRIPTION OF THE PREFERRED EMBODIMENT

Figure 1:
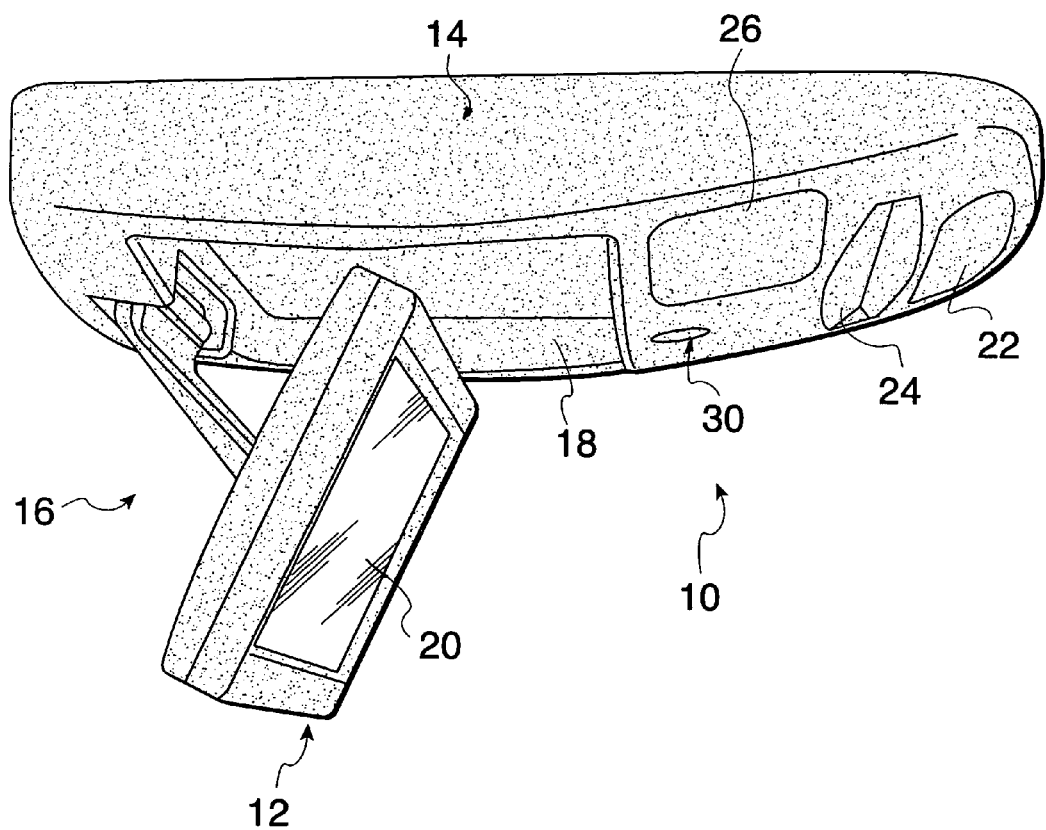
FIG. 1 is a perspective illustration of a video monitor having a latch system constructed in accordance with and embodying the invention and illustrating an overhead console and a pivotally mounted display housing with the housing being stowable in an open stowage cavity of the console.
Figure 2:
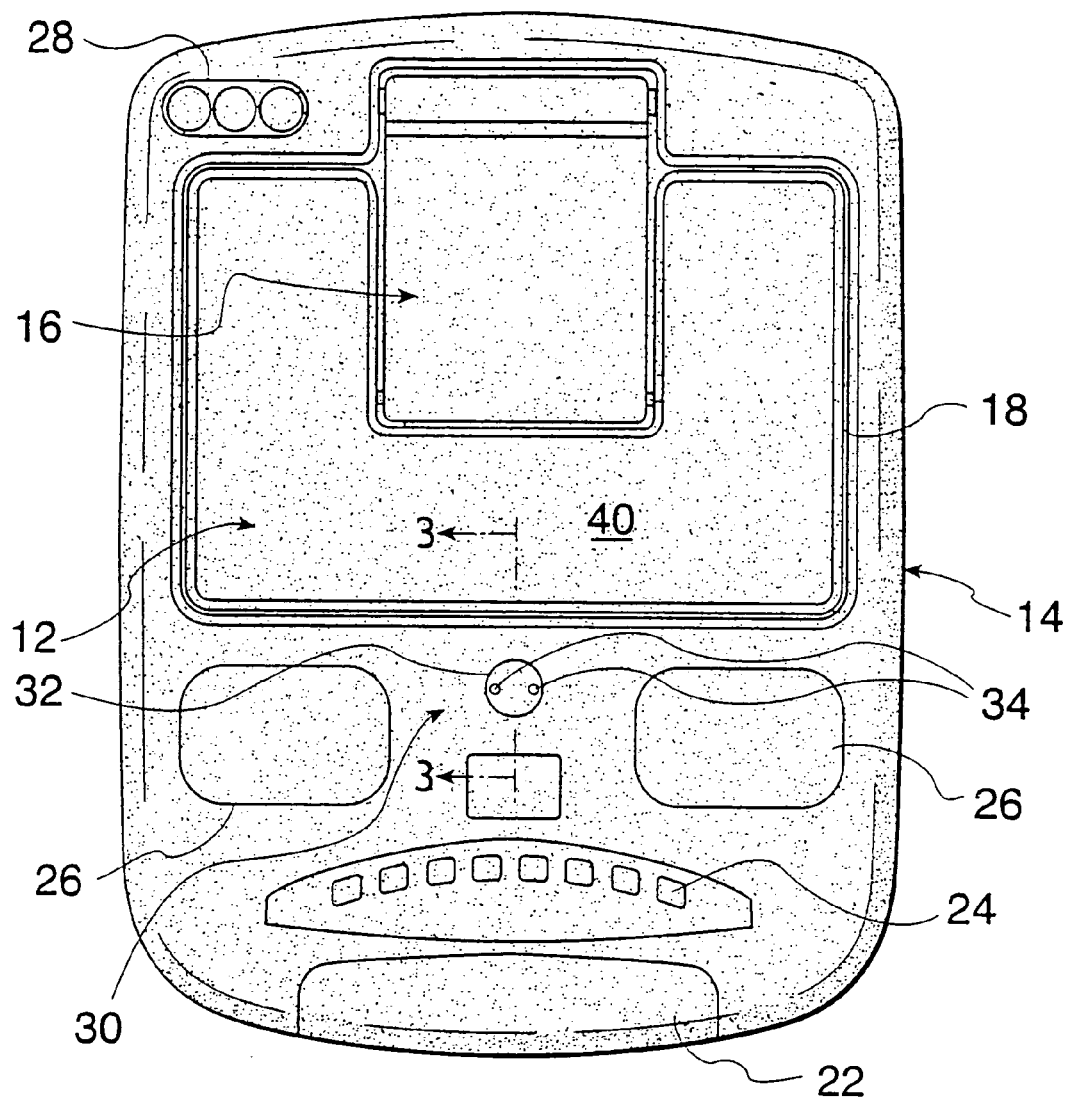
FIG. 2 is a bottom plan view of the video monitor with the display housing being in a stowed position and illustrating shallow finger well of the latch system including a pair of touch contacts.

Referring now in detail to the drawings, wherein like numerals denote like components throughout, the reference numeral 10 denotes generally a video monitor comprising a display housing 12 and a console 14. A hinge assembly 16 pivotally interconnects the display housing 12 with the console 14 and is employed to guide the movement of the display housing 12 relative to the console 14 from a display housing stowage position, seated within an open stowage cavity 18 of the console (as illustrated in FIG. 2), to a viewing position depicted in FIG. 1, wherein a display panel 20 is at an appropriate viewing angle and distance relative to a viewer.

The video monitor 10 includes various controls and accessories such as an infrared remote control sensor 22, a membrane keyboard or keypad 24 for various manual input selections such as power, volume, channel input source, menu, and the like, auxiliary interior lights 26 and input/output jacks 28. There is also provided a shallow concave finger well or recess 32 having a pair of exposed touch sensor contact terminals 34 of a touch control 35.

Figure 3:
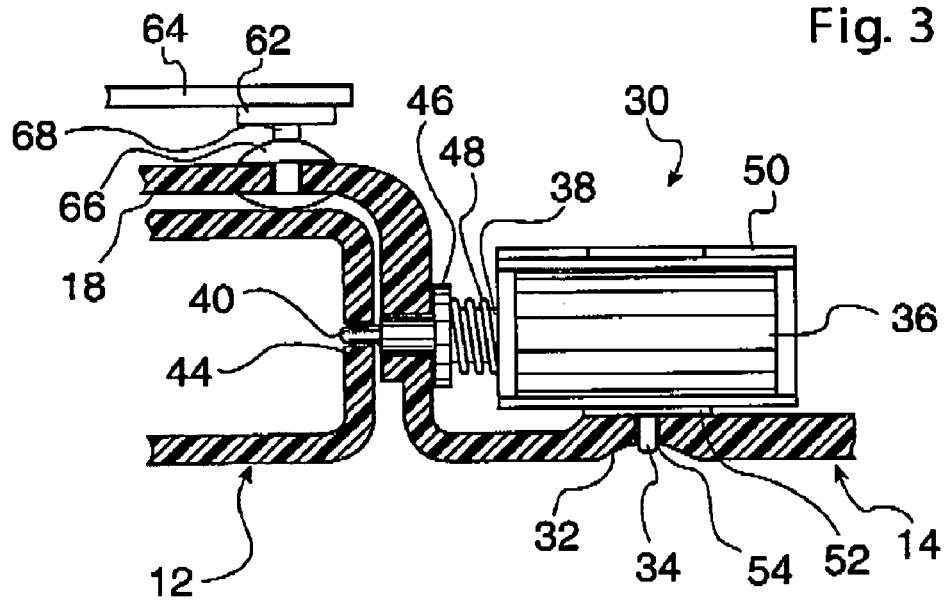
FIG. 3 is an enlarged scale fragmentary sectional view through the console and display housing and illustrating a solenoid having a slidable core including a detent pin, with the latch pin extending through an aperture in a cavity wall and into a receptacle in a wall of the display housing.
Figure 4:
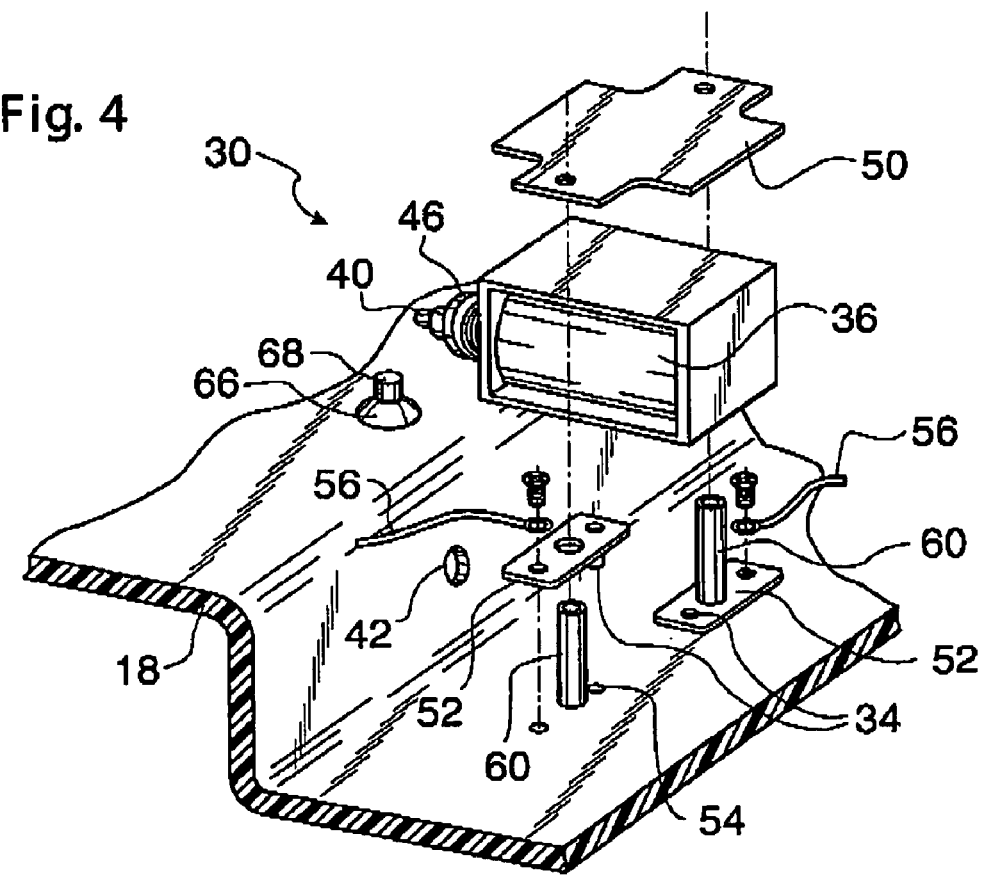
FIG. 4 is a fragmentary exploded view showing the manner, in which the solenoid and the touch contacts are mounted within the console.

Referring now to FIG. 3 and FIG. 4, wherein a latch system 30 is illustrated in detail, the latch system 30 includes a solenoid 36 having a sliding latch core 38 with a detent pin 40 at its distal end. The detent pin 40 extends through an aperture 42 in a front wall of the cavity 18. With the display housing 12 in its stowed position, as illustrated in FIG. 2 and FIG. 3, a receptacle, i.e. a recess or aperture 44, of a corresponding wall of the display housing 12 is in registration with the casing aperture 44 and the detent pin 40 engages and extends into the receptacle 44. An annular flange 46 formed on the sliding core 38 is engaged by a helical spring 48 to urge the sliding core 38 toward the cavity 18 and into the receptacle 44.

In accordance with the invention, a mounting plate 50 is employed to secure the solenoid 36 in position, with mounting screws extending through apertures in the mounting plate 50 and engaging a pair of mounting posts 60 formed in the interior or the console 14.

It should be noted that the solenoid 36 is positioned in registration with the well 32 and touch contacts 34. The touch contacts 34 extend from a pair of contact plates 52 through apertures 54 formed in the console 14. A suitable electrical lead 56 engages each contact plate and is secured thereto by a suitable mounting screw.

The contact plates 52 include apertures in registration with the mounting posts 60 and are positioned at the base of the mounting posts 60. A suitable electrical insulation layer is provided between the contact plates 52 and a solenoid frame.

It should be additionally noted that a position sensor switch 62 is carried on a circuit board 64 mounted within the casing 14 in registration with the stowage cavity 18.

A grommet 66, formed of rubber or other resilient material, extends through an aperture in an upper horizontal panel of the stowage cavity 18. The grommet 66 carries a moveable rod 68 which is in registration with the position sensor switch 62. When the display housing 12 is stowed in the cavity 18, a surface of the housing 12 engages the grommet 66, causing the rod 68 to extend upwardly and actuate the position sensor switch 62.

The position sensor switch 62 is operatively connected to a processor 70, which receives input signals from the remote sensor 22 as well as the membrane keyboard 24. When the processor detects that the display housing 12 is in its stowed position, through interrogation of the position sensor switch 62, the processor proceeds 70 to disengage power supply to a display driving circuit 75 which drives the display panel 20.

Similarly, when the processor 70 interrogates the switch 62 and detects that the solenoid 36 has been actuated and the display housing has been released from its stowed position, the processor 70 actuates the display driving circuit 75.

Referring now to FIG. 5 wherein a simplified, schematized illustration of a typical solenoid driving circuit is illustrated, it should be noted that pursuant to the invention, the processor 70 can effect actuation of the solenoid to cause the detent pin 40 to disengage from the housing aperture 44 and thus permit the display housing 12 to be operatively positioned for viewing. Such actuation could be provided responsive to a signal received from the infrared remote sensor 22 or the "power" button of the membrane keyboard 24.

Additionally, the processor is programmed to store, in a nonvolatile memory, a display housing position signal in the event the display housing 12 is in a deployed viewing position at the time power is disconnected to the video monitor, as by a vehicle ignition switch. In the event a passenger or vehicle operator returns the display housing 12 to its stowed position while the power has been turned off, the processor 70 detects such change by interrogation of the position sensor switch 62 upon powering up and is programmed to automatically generate a solenoid actuation signal.

In the event of any occurrence wherein the processor determines that the solenoid 36 should be actuated, a processor generated solenoid activation signal appears at the base of a first transistor 72, causing such transistor to switch on, which causes a second transistor 74 to switch, thereby switching a third transistor 76 to a conductive state. This, in turn, effects the switching of a fourth transistor 78 which, in turn, effects the switching of a fifth transistor 80, resulting in supplying power to the solenoid 36.

Pursuant to the invention, engagement of the touch contacts 34 by a person's finger or other electrically conductive material effects the switching of the transistor 76 to a conductive state which switches the transistor 78, which effects switching of the transistor 80 for powering the solenoid 36.

Thus it will be seen that there is provided a latch system for a video monitor which achieves the various aspects, features and considerations of the present invention and which is well adapted to meet the conditions of practical usage.

As various changes might be made in the latch system for video monitor above set forth without departing from the spirit of the invention, it is to be understood that all matter herein described or shown in the accompanying drawings is to be interpreted as illustrative and not in a limiting sense.

Having thus described the invention there is claimed as new and desired to be secured by Letters Patent:

1. A video monitor, the video monitor comprising a display housing, a console having a storage cavity dimensioned to receive the display housing and a releasable latch system for retaining the display housing in the storage cavity, the display housing being mounted to the console for pivotal movement into and out of the storage cavity, the storage cavity including a cavity wall, the cavity wall having an aperture therethrough, the latch system including a detent pin extending through the aperture, the display housing including a receptacle formed in a wall of the display housing, the receptacle being in registration with the aperture when the display housing is in a stowed position within the storage cavity, the detent pin being normally biased to extend through the aperture and into the receptacle when the display housing is in the stowed position, the latch system further including a solenoid carried in the console, the detent pin being operatively connected to the solenoid, the console including a touch sensor, the latch system further including a circuit operatively connected to the touch sensor and operatively connected to the solenoid for actuating the solenoid to withdraw the detent pin from the receptacle in response to a user touching the touch sensor whereby the display housing may be pivoted out of the storage cavity, the video monitor further including a display driving circuit and a display housing position sensor, the position sensor being carried in the console, the position sensor detecting when the display housing has been released from the storage cavity in response to actuation of the solenoid and generating a signal, the display driving circuit being engaged in response to the position sensor signal.

2. A video monitor as constructed in accordance with claim 1 wherein an exterior surface of the console includes a concave recess, at least a portion of the touch sensor being positioned in the recess.

3. A video monitor as constructed in accordance with claim 1 further including a processor, the processor being operatively connected to the circuit for actuating the solenoid, at least one processor input device, the processor being operatively connected to the processor input device, the processor receiving a signal from the processor input device and in response thereto, generating a signal for actuating the solenoid, the circuit for actuating the solenoid receiving the processor generated signal and in response thereto, actuating the solenoid.

4. A video monitor as constructed in accordance with claim 1 wherein the touch sensor comprises a pair of electrical contacts.

5. A processor implemented video monitor as constructed in accordance with claim 3 further including a plurality of processor input devices, the processor receiving a signal from one of the input devices.

6. In a video monitor having a display housing and a console, a hinge assembly pivotally interconnecting the display housing and the console, the console having a stowage cavity dimensioned to receive the display housing, the improvement comprising a latch system, the latch system including a solenoid mounted within the console, the solenoid carrying a sliding core having a detent pin at an end thereof, the stowage cavity having a wall with an aperture formed therethrough, the detent pin extending through the aperture, the display housing having a wall with a receptacle formed therein, the detent pin extending through the aperture and into the receptacle when the display housing is in a stowed position, the latch system further including a touch sensor having a user engageable portion positioned on the exterior of the console, the touch sensor being actuated to interconnect the solenoid with a power supply, the touch sensor comprising a touch contact terminal projecting from a contact plate, the contact plate being fixed to the interior of the console and the touch contact terminal projecting through an aperture in the console whereby when the user engages the touch sensor, the solenoid withdraws the detent pin from the receptacle, thereby releasing the display housing for pivotal movement from the stowage cavity.

7. The improvement in a video monitor as constructed in accordance with claim 6 wherein the console includes a concave finger well, at least a portion of the touch sensor being positioned in the finger well.

8. A processor implemented video monitor, the video monitor comprising a display housing, a console having a storage cavity dimensioned to receive the display housing, a hinge assembly pivotally interconnecting the display housing and the console, a processor, an input device operatively connected to the processor, a display driving circuit operatively connected to the processor and a releasable latch system for retaining the display housing in the storage cavity, the storage cavity including a cavity wall, the cavity wall having an aperture therethrough, the latch system including a detent pin extending through the aperture, the display housing including a receptacle formed in a wall of the display housing, the receptacle being in registration with the aperture when the display housing is in a stowed position within the storage cavity, the detent pin being normally biased to extend through the aperture and into the receptacle when the display housing is in the stowed position, the latch system further including a solenoid carried in the console, the detent pin being operatively connected to the solenoid, the latch system further including a solenoid driving circuit operatively connected to the processor and operatively connected to the solenoid for actuating the solenoid to retract the detent pin from the receptacle in response to a signal generated by the input device.

9. A processor implemented video monitor as constructed in accordance with claim 8 further including a touch sensor, the solenoid driving circuit being operatively connected to the touch sensor for actuating the solenoid in response to a user touching the touch sensor.

10. A processor implemented video monitor as constructed in accordance with claim 8 wherein the input device comprises a remote control sensor.

11. A processor implemented video monitor as constructed in accordance with claim 8 wherein the input device comprises a membrane keyboard.

12. The improvement in a video monitor as constructed in accordance with claim 6 wherein the console is oriented in a horizontal position and the display housing pivots downwardly from the console when released from the stowage cavity.

13. The improvement in a video monitor as constructed in accordance with claim 6 wherein the touch sensor comprises a pair of touch contacts, each touch contact projecting from a contact plate fixed to the interior of the console, each touch contact extending from its respective contact plate through an aperture in the console.

14. The improvement in a video monitor as constructed in accordance with claim 13 wherein the console includes a concave finger well, the apertures in the console being positioned at the finger well, each touch contact extending into the finger well through an aperture in the console.

15. The improvement in a video monitor as constructed in accordance with claim 6 further including a remote control sensor carried by the console, the remote control sensor being operatively connected to the solenoid for actuation of the solenoid to release the display housing in response to a signal received at the remote control sensor.

16. The improvement in a video monitor as constructed in accordance with claim 15 wherein the remote control sensor comprises an infrared sensor.

17. The improvement in a video monitor as constructed in accordance with claim 6 further including a membrane keyboard carried by the console, the membrane keyboard being operatively connected to the solenoid for actuation of the solenoid to release the display housing.

18. A video monitor as constructed in accordance with claim 1 wherein the solenoid includes a slidable core and the detent pin is positioned at the end of the core.

* * * * *